United States Patent

[11] 3,600,918

| [72] | Inventor | Jerome H. Lemelson<br>85 Rector St., Metuchen, N.J. 08840 |
|---|---|---|
| [21] | Appl. No. | 734,686 |
| [22] | Filed | June 5, 1968<br>Continuation-in-part of Ser. No. 373,482, June 8, 1964, Pat. No. 3,387,330, which is a Continuation-in-part Ser. No. 142,405, Oct. 2, 1961 and Ser. No. 691,622, Oct. 2, 1957, Pat. No. 3,002,615. |
| [45] | Patented | Aug. 24, 1971 |

[54] EXTRUSION APPARATUS AND METHOD
13 Claims, 7 Drawing Figs.

[52] U.S. Cl. .................................................. 72/7,
72/256, 264/132
[51] Int. Cl. .................................................. B21b 37/14,
B21c 23/00, B28b 21/54
[50] Field of Search........................................ 264/209,
177, 132, 271; 207/1.3; 72/256, 21, 8, 7

[56] References Cited
UNITED STATES PATENTS
| 2,566,854 | 9/1951 | Rhodes............................ | 18/2 |
| 2,544,467 | 3/1951 | Michel............................ | 18/2 |
| 2,369,858 | 2/1945 | Ryan............................... | 264/40 |
| 2,372,162 | 3/1945 | Ryan............................... | 18/2 |
| 2,747,224 | 5/1956 | Kock et al........................ | 18/2 X |
| 2,747,222 | 5/1956 | Kock et al........................ | 18/2 |
| 3,096,672 | 7/1963 | Jones.............................. | 72/406 X |

Primary Examiner—Charles W. Lanham
Assistant Examiner—R. M. Rogers

ABSTRACT: An extrusion apparatus is provided which includes auxiliary means cooperating with the extruder in forming material to shape. In one form, the auxiliary means employs vibrational means for facilitating extrusion and improving the extruded article.

In another form, the auxiliary means includes a mandrel and means for predeterminately varying the shape of an extrusion formed on the mandrel.

The invention is also drawn to methods for extruding articles of composite materials and improvements in the art of extrusion.

PATENTED AUG 24 1971                                    3,600,918

INVENTOR.
JEROME H. LEMELSON

PATENTED AUG 24 1971 3,600,918

*INVENTOR.*
Jerome H. Lemelson

EXTRUSION APPARATUS AND METHOD

RELATED APPLICATIONS

This is a continuation-in-part of copending application Ser. No. 373,482 filed June 8, 1964, now U.S. Pat. No. 3,387,330 and having as parent applications Ser. No. 142,405 filed Oct. 2, 1961, and Ser. No. 691,622 filed Oct. 2, 1957 now U.S. Pat. No. 3,002,615.

SUMMARY OF THE INVENTION

This invention relates to an apparatus for extruding material and operating on said material after it has left the extrusion die to control its characteristics.

In the formation of extruded articles such as tubing, structural shapes and other elongated members, it is frequently necessary to perform one or more operations on said shapes after they have been formed. Heretofore, the general practice has been to extrude an elongated member, cut it to length after it has solidified and, at some time thereafter, perform one or more operations on the cut lengths of extrusion to change or improve their characteristics. Such procedures are generally quite costly as they require a substantial amount of rehandling and machine time to perform post operations on the extrusion. By means provided herein, a number of post operations may be performed on an extrusion directly after it is extruded and before it has been cut to length, thereby providing the finished length of extrusion with predetermined characteristics without the need for rehandling and, in certain instances, reheating same. Accordingly, it is a primary object of this invention to provide a new and improved apparatus for both forming and operating on an extrusion during a single pass thereof so as to reduce the amount of rehandling of the extrusion in processing same.

Another object is to provide an improved method and apparatus for employing feedback control means in an automatic control loop to improve the characteristics of an extrusion by maintaining the tension on the extrusion after it is formed substantially constant.

Another object is to provide an improved method of working an extruding metal to improve its crystalline structure and predetermine its physical characteristics.

Another object is to provide improvements in apparatus and methods for cooling and solidifying an extrusion as it flows from an extruder.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention, as claimed.

Figures 1, 2, 3:
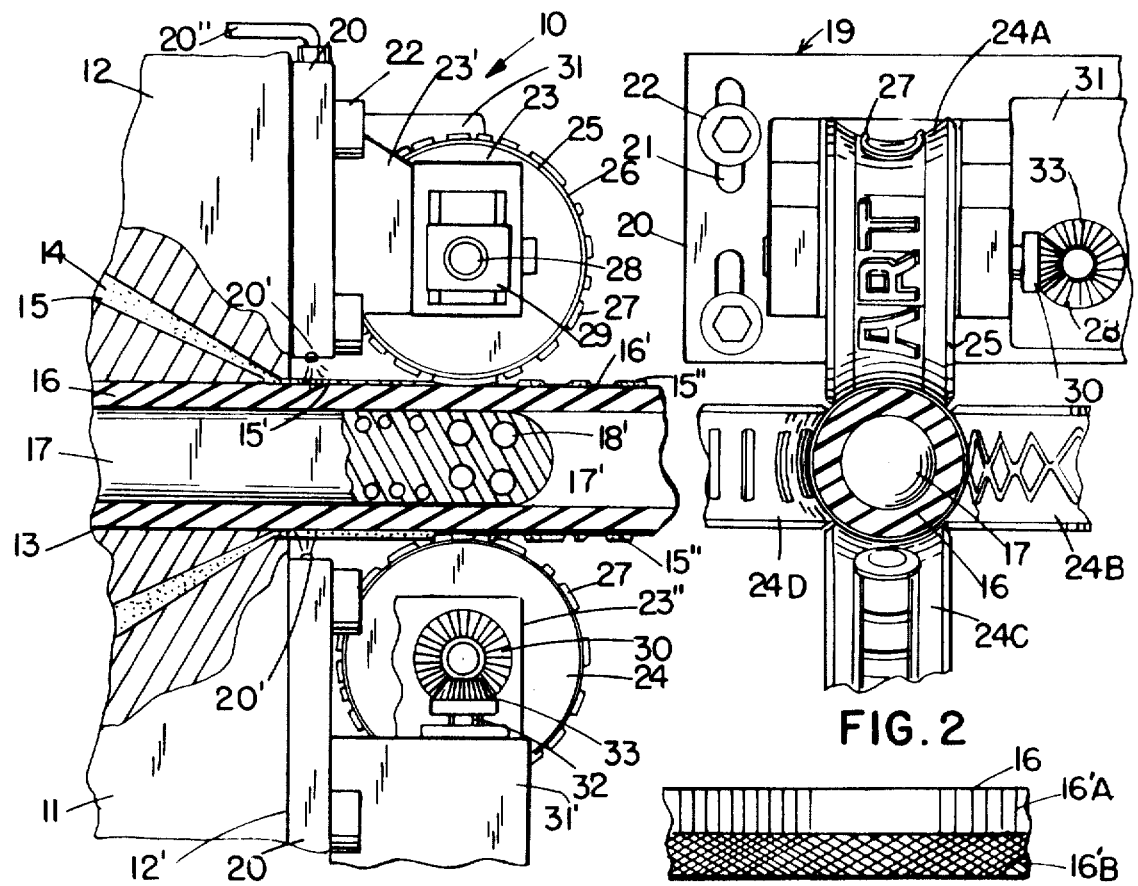
FIG. 1 is a side view with parts broken away for clarity of an extrusion apparatus and embossing means operative on the extrusion after it leaves the extruder.
FIG. 2 is a front view of FIG. 1.
FIG. 3 is a view of fragment of an extrusion.

FIG. 1 illustrates a portion of an extrusion apparatus 10 including an extrusion of tubular shape being formed thereby and means for automatically emboss-decorating the exterior surface of the extrusion. The apparatus 10 includes an extruder 11 including a die portion 12 having a mandrel 17 centrally positioned within an opening 13 in the die for defining the interior surface of a tubular or hollow extrusion 16.

In a preferred form of the invention, the exterior surface of the extrusion is decorated by coating said surface with a thin coating or film of plastic or other suitable coating material and embossing or otherwise surface working the coating in a manner to cause it to become separated along portions thereof so that the material comprising the main portion of the extrusions is viewable through the embossings. Thus, if the main portion or body 16 of the extrusion is made of a plastic of a first color and is coated with a plastic of a second color, the surface of the resulting extrusion will be decorated in two colors; the coated material being visible to the eye of an observer where it is not separated or embossed while the first color is visible only in those areas where the coating is separated by embossing. However, in other forms of the invention, the apparatus illustrated may be utilized to provide decorative and functional embossings along the length of the extrusion as it extrudes without resort to multiple colors. By operating on a freshly extruded shape or formation as it is forced or is drawn from the extrusion machine, the need to rethread and rework the extrusion at a future time is eliminated and if the process is carried out continuously and automatically, problems of alignment and registration of the embossing means are eliminated.

In FIGS. 1 and 2, the principle illustrated in my said copending patent application and issued patent is applied in which one or more surface forming or embossing tools cooperatively engage a freshly extruded formation in alignment with an extension of the mandrel over which the extrusion is formed and which defines the interior surface of the extrusion so as to prevent the extrusion from inwardly deforming or collapsing. A plurality of wheels or rotary embossing dies 23 and 24 are provided in FIG. 1 and are supported at the end of the extrusion chamber 11 in a manner to be adjustably engageable with the surface of the extrusion as it leaves the die and preferably while it is in the proper physical condition necessary to effect the desired physical changes in the extrusion to be described.

The main extrusion 16 which, in FIG. 1, is illustrated as a tubular member of rectangular cross section, is shown exuding from the extrusion die 12 over the mandrel 17 and is coated on at least its upper and lower surfaces or portions thereof with a second material 15 shown flowing through one or more passageways 14 extending through the extrusion die 12 to the surface of the opening 13 near the end of the die opening. The extrusion material 14 is preferably of a different color than the material comprising the main extrusion 16 and may comprise essentially the same resin or a coating material of a different chemical composition than that comprising 16.

For most of the more common polymeric thermoplastic, plastics such as polyvinyl chloride, polyethylene, polypropylene, cellulose acetate, styrene or the like, the coating 15' is deposited preferably to a depth of 0.004 inches or less so that when the surface of said coating is deep embossed as illustrated, the coating will separate leaving a separation in the coating which will appear as a design in the color of the material of the base 16 of the composited extrusion. As stated, the coating may substantially cover the entire exterior surface of the extrusion 16 or may extend along band or strip areas thereof depending on the resulting effects desired. Coating is preferably effected while either or both materials are in a semimolten condition so as to effect the integral adherence or coherence of both materials into a unitary structure. However, it is noted that the material comprising the coating 15' is preferably sufficiently solidified by the time the embossing wheel or drum is brought thereagainst so as to effect discreet separations in the coating material which remain separated as illustrated at 16' so that the material of the base 16 is clearly viewable and so that the coating material does not flow back into place to obscure those portions of the surface of the base 16 which are desired to be viewed and to effect a two color pattern along the surface of the composite extrusion.

In FIG. 1, two embossing dies 23 and 24 are shown rotationally supported on respective fixtures which are mounted against a face of the die or end of the extrusion chamber so as to position said embossing rolls against respective portions of the exterior surface of the composite extrusion in alignment with the end portion 17' of the mandrel 17 which projects beyond the end of the extrusion die, as illustrated. Thus, the mandrel 17 cooperates with the embossing rolls and supports the extrusion moving thereover against inward deflection and prevents its buckling under the force exerted by the embossing rolls, whereby the extrusion and/or coating may be deeply embossed.

Each embossing roll or wheel comprises a disc or cylindrical-shaped base 25 having raised portions 27 disposed around the peripheral surface of 25 and defining the designs to be embossed in the surface of the extrusion as it moves away from the extruder. Disposed between raised portions 27 are indentations 26 in the surface of the embossing wheel or drum which are shaped to leave portions 15" between the indented portions 16' of the extrusion.

While the embossing rolls may be free wheeling and driven to rotate as the result of engaging the surface of the moving extrusion, they are preferably power operated by the same or respective drive servos or motors. A single motor preferably powers the two or more embossing rolls engaging the surface of the extrusion 16 although in FIG. 1 two motors 31 and 31' are illustrated each driving a respective of the embossing rolls 23 and 24. The motors are preferably operated in synchronization with the operation of the extrusion rate-of-flow servo driving the extrusion screw or piston or in response to a feedback single derived in sensing the speed of the extrusion 16 such as by means of a wheel rotating thereagainst further downstream. The embossing wheel 23 is shown mounted on a fixture 23' in the form of a plurality of brackets extending from a base 20 which is bolted to the front face 12' of the extrusion die or chamber. A plurality of socket screws 21 retain base 20 against the face of 12.

In FIG. 1, the bearings 29 for the shafts 28 on which the embossing rolls are mounted are shown adjustably positionable so as to position the perimeter of the embossing roll at the desired location relative to the extrusion. However, the entire fixture assembly 19 including the base plate 20 may be radially positionable relative to the opening in the extrusion die by means of slotted holes 21 therein through which the mounting socket screws 22 extend.

The drive motor 31' includes an output shaft 32 having mounted at its end a bevel gear 33 which engages the teeth of a bevel gear 30 secured to the shaft 28 on which the embossing wheel is mounted for driving said wheel. Notation 23" refers to one of the brackets rotationally supporting the embossing wheel 24 off the mounting plate 20'.

In FIG. 2 is shown a front view of a portion of an apparatus which is a modified form of that illustrated in FIG. 1 in which a cylindrical extrusion 16E is engaged by four embossing dies 24A to 24D which are mounted either aligned with each other or staggered or aligned with the extended portion of the mandrel 18 and cooperate to emboss separate portions of the exterior surface of the extrusion. These portions may each include a quarter of the surface of the extrusion or less depending on the coverage of the respective embossed portions of the dies. The raised portions 27 to die 24A are illustrated as alphanumeric characters operative to emboss words or characters in the surface of the extrusion engaged thereby. Various of the designs for embossings are illustrated as extending around at least portions of the rotary dies 24B, 24C and 24D which are rotated so as to present the embossing surfaces of each at the speed of the extrusion, by the respective servomotors or a single drive means coupled to all four dies.

Further details of the apparatus illustrated in FIGS. 1 and 2 include cooling means in the form of passageways 18' extending through the end portion 17' of the mandrel 17 for the production of heat transfer fluid therethrough to cool and solidify the base extrusion 16 and the coating thereon to present it in the proper physical condition by the time it has reached the embossing dies. To further improve or hasten such solidification, a plurality of jets of fluid coolant are ejected against the surface of the coated extrusion as it leaves the die and are illustrated in FIG. 1 as exhausting from respective passageways and openings 20' provided in the base plates 20 of the mounting fixtures. Fluid-conducting lines 20" are operatively connected to the passageways in plates 20 and extend from a source of pressurized coolant such as air or other heat transfer fluid ejected at the proper temperature against the surface or surfaces of the composite extrusion.

Mandrel 18' may also be cooled by providing an electrical heat sink such as a thermoelectric cooling device mounted therein to receive and convert the heat of the extruding material conducted thereto, to electrical energy and thereby dissipate said heat.

Other variations in the structure and operation of the apparatus of FIGS. 1 and 2 include:

a. provision of either or both embossing rolls or wheels 24 and 25 radially or otherwise movable by means of a servomotor during an extrusion cycle and controlled by automatic means such as a programmer to engage only selected portions of the extrusion or to vary insofar as depth of penetration of the work is concerned or otherwise shaping the workpiece by control of said servo.

b. Injection of a gas such as air of refrigerant through the mandrel 17 into the interior of the extrusion 16 to effect rapid cooling from the interior thereof.

c. If the coating material 15 is plastic, ceramic, glass or metal in fluid or powder form, it may be worked per se or forced to penetrate and become mechanically bonded to the surface of the extrusion by the mechanical compressive action of multiple rolls such as 24 and 25 having, however, smoothly shaped surfaces engaging said coating material.

FIG. 3 illustrates a portion of an extrusion extruded by means of the apparatus of FIGS. 1–5 showing how portions 16'A and 16'B of the surface of said extrusion may have the same or different embossed designs provided therein. For example, the portions 16'B has a hatched design rolled therein and, by the manner illustrated in FIGS. 1 and 2. This design consists of deep enough channels or separations in the coating which cross each other and allow the color of the base portion 16 to be viewed in contrast with those portions of the coating which are not so separated.

Figures 4, 5:
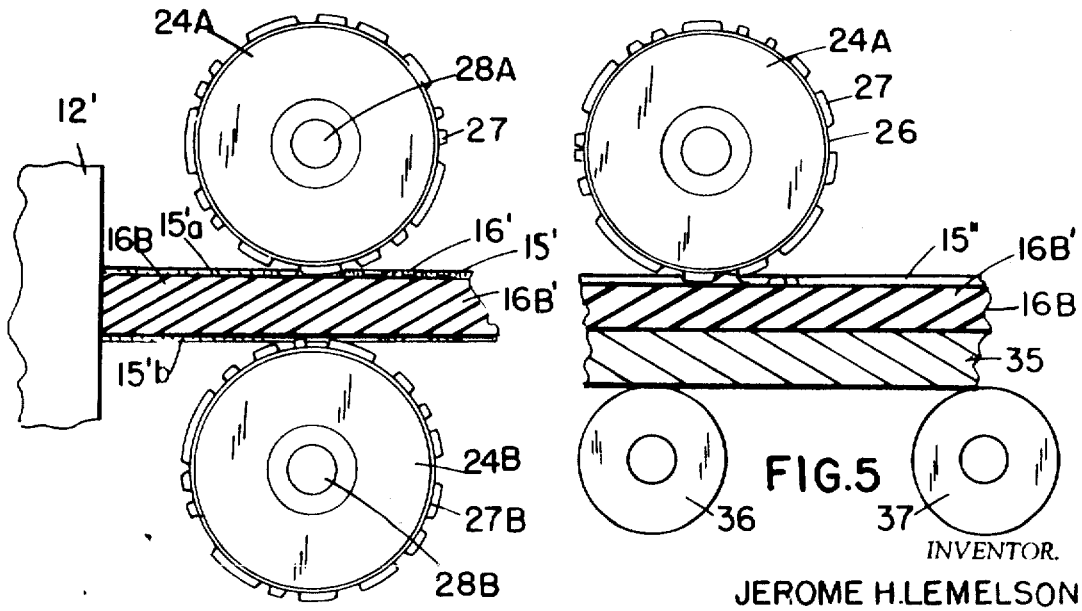
FIG. 4 is a side view of apparatus of the type shown in FIGS. 1 and 2 modified to extrude solid shapes.
FIG. 5 is a side view of a modified embossing apparatus.

In FIG. 4, a plurality of embossing rolls 24A and 24B are shown aligned with each other so as to cooperate in providing embossings in respective upper and lower surfaces of a solid extrusion 16B after it has been removed from the extrusion die 12'. While the rotary embossing dies 24A and 24B may be mounted as in FIGS. 1 and 2 against the face of the extrusion chamber or die, they may also be mounted on a separate fixture provided at a suitable location downstream of the extrusion and may be power operated by a common drive means or separate servos to both emboss and drive the extrusion therethrough. Accordingly, in the embodiments illustrated in FIGS. 1–4, the extrusion itself may be driven from the extruder by means of the pressure applied to the extrusion material, the embossing rolls and/or auxiliary power driven conveying equipment such as a belt conveyor or puller mechanism.

The extrusion 16B is illustrated in FIG. 4 as comprising a base or core portion 16B' comprising the major portion of the extrusion having its entire exterior surface or bandlike portions thereof coated with a coating material 15'b as described which material is separated in those portions engaged by the raised portions of the embossing rolls so as to allow portions of the base material 16B' to be viewed from the exterior of the extrusion and to provide a two-color decorative effect. Here again, both embossing rolls are preferably power rotated so that their peripheral surface is travelling at the same velocity as the extrusion although either or both may be driven by the extrusion itself depending on its characteristics.

In FIG. 5, a single extrusion roll or die 27A is shown engaging the upper surface of a composite extrusion comprising a base portion 16B having a coating 15" on the surface so engaged and adapted to be embossed and separated to provide a two-color design in the extrusion as described, the lower surface of the base portion 16B'. The extrusion 16B may have any suitable shape other than tubular along that portion which is engaged by the embossing guide. The lower surface of the extrusion is shown abutting and supported by a belt 35 which is driven in a closed loop path parallel to the extrusion after it has exuded from the extruder, over a plurality of rollers, two of which 36 and 37 are shown. Depending on the stiffness and degree of support afforded to the extrusion by the belt 35, which may be of any suitable material, the extrusion die may or may not operate in alignment with one of the rollers supporting the belt 35 to provide embossings in the upper surface of the extrusion. The embossings may be utilized to provide a decorative or functional pattern in the upper surface of a conventional extrusion or to provide a two-color design as described, in a multiple layer or coated extrusion.

The rolls 36 and 37 may be power driven to rotate at the speed of the extrusion to drive the belt or plate 35 at the same lineal speed as the extrusion or may be free wheeling if adapted to directly engage the bottom face of the extrusion itself. At least one roll 36 is preferably directly aligned with embossing roll 24A.

Variations in the process, materials and apparatus illustrated in FIGS. 1–5 are noted as follows:

I. An extrusion fabricated of a single material may be surface embossed on a continuous basis as it is extruded by the apparatus illustrated and the embossings may be provided per se along a strip portion or portions of its longitudinal surface or about substantially the entire surface. A multicolor decorative effect may be provided by wipe or roller applying a material of a second color to fill or partially fill the cavities formed by embossing and such material may be automatically and continuously applied to the surface or surfaces of the extrusion after it has been embossed and while it is either in a semimolten or completely solidified condition downstream of the embossing roll or rolls. The embossings thus define means for providing receptacles for the material or materials wiped or otherwise applied to the surface of the embossed extrusion so that, in effect, only the indentations in the extrusion become colored with the second color or colors.

II. Multicolor effects may be provided by embossing completely through the thin surface coating provided along the entire exterior surface or portions of the surface of the extrusion as described. This procedure as well as that described above may include the use of multiple polymeric materials for the base and coating or wipe applied decorative material; colored inks applied to a plastic base; or combinations of metal, with plastic or other colorants provided by wiping or coating on the extruded metal as described. In either case, the embossings may be provided in the extruded metal shape per se or merely through the coating provided thereon.

III. Multiple color effects may be provided in a polymeric or metal extrusion by one or more of several methods. These include: (a) the strip coating of a polymeric or metal extrusion as it extrudes with different colored polymeric or other materials along different, parallel band areas of the extrusion and the continuous embossing and separation of selected of said coatings to permit the base color to show through; (b) the provision of a multiple color base extrusion by extruding a plurality of different colored polymeric materials in a single die and the coating thereof with one or more materials of the same or different colors whereafter embossing is effected as described to separate portions of the coating material so that the base colors will show through; (c) the extrusion of a main shape of plastic, metal or any other suitable material of a first color and the extrusion or otherwise application thereon of a plurality of layers of coating material, each layer being of a different color. Embossing the resulting coated extrusion to different depths will result in the provision of designs of different colors in the extrusion.

IV. Apparatus of the type illustrated in FIGS. 1 to 3 may also be utilized to perform various other operations of an extrusion as it extrudes by modifying the surface shape of the power driven rolls 24 and 25. For example, the rolls may be utilized to cold work the metal extrusion to improve its surface characteristics or the grain structure of a substantial portion of the extrusion by compressive rolling of the shape and/or by drawing the extrusion away from the extruder to impart a degree of drawn elongation thereto. The rolls may also be utilized to transversely form the extrusion with surface ripple formations or corrugations extending in an longitudinal direction. Deep embossings defining separate cavities in either or both surfaces of the extrusion may be formed therein by properly shaping the surface formations 27 of the embossing rolls to provide said extrusion as a waffle or honeycomblike structure. The cavities so formed may extend partially or completely through the extrusion and are preferably, although not necessarily, formed while the extrusion is in a semimolten condition and more easily deformed.

V. In another form of the invention, rolls 24 and 25 (or 24A and 24B) may either or both be operative to engage and retract from their respective surfaces of the extrusion, each separately controlled by a respective servo to so move which servos may be program controlled so as to provide embossings along predetermined portions of the extrusion.

VI. Either or both embossing rolls 24 and 25 may also have different patterns formed or provided in different lateral portions of the embossing surfaces thereof whereby different patterns may be embossed in the same or different extrusions by laterally shifting the roll(s) between extrusion cycles and positioning a new pattern aligned with the extrusion die opening. The entire action may be automatic or manually adjustable.

VII. Where it may be required to impart different physical characteristics to an extrusion or otherwise formed elongated shape such as different degrees of cold working or stretch, the rotational force and speed applied to one or more pairs of rolls such as 24, 25 or 24A, 24B adapted to receive the extrusion may be varied by a programming means applied to the drive means therefore to vary the drawing force in a predetermined manner during an extrusion or drawing cycle. In other words, a shape may be stretch or draw formed in which portions thereof are reduced in cross section with respect to either the original shape or the shape of other deformed portions by varying the drawing force in a predetermined manner during a drawing cycle.

VIII. In yet another form of the invention, extrusion apparatus of the type illustrated in FIGS. 1 and 2 may be operative to produce a tubular plastic extrusion having a base tube or parison coated with a plastic of a different color described. The extrusion may be downwardly disposed and provided in a semimolten state to define a parison applicable to blow molding or may be cut to predetermined length and utilized thereafter as a parison upon reheating for the so called blow-molding thereof to a predetermined shape into the cavity of a mold clampingly engaging both ends of the parison during blowing. The walls of the mold may be so shaped as to cause portions of the coating material 14 to separate when blown against said shaped mold portions and to thereby selectively expose portions of the base portion 16 of the extrusion which are of different color than the plastic coating the exterior of the parison. Coating thicknesses may range from a mill or less to several mills or more depending on the desired effects, plastics employed, etc. The mold portions operative to effect separation of the coating engaged thereby protrude from the adjacent portions of the mold wall as ridge and/or indentations of tapered or V cross-sectional shape, and may be utilized to provide various decorations in the shape of outline figures, alphanumeric characters or designs of regular or irregular shape. In certain instances, the outer edging of the ridges or indentations so formed in the mold walls may be sharp or knifelike. The outer coating provided on the parison or extrusion is preferably sufficiently solidified by the time the mold is opened to prevent said coating from refilling the separations therein made by the ridgelike formations or steps in the mold wall. In other words, sharp inflections in the contour of the mold wall may also be operative to separate or sufficiently reduce the thickness of the coating to permit the material therebeneath to be seen from the exterior of the blow-molded shape. Formations of ceramic, glass or metal may be similarly coated, formed to shape in a die or mold and decorated by indenting and separating portions of the coating or outer layer.

IX. In yet another form of the invention, the apparatus of FIG. 4 or FIG. 5 may be modified to emboss one surface of an extruding metal sheet or sheet formed by rolling and to feed said sheet thereafter through a rolling mill adapted to roll it into tubing or other shape which process may include means for welding or otherwise joining the edges of the sheet so formed to provide a sealed tube. Rolling of the freshly extruded or rolled sheet may be effected in a manner to fold the edges thereof parallel to the longitudinal axis of the tube by passage thereof through a plurality of pairs of forming rolls of different shape or by spirally rolling said extruding sheet and continuously welding the edging thereof by resistance or pressure welding means or other suitable welding means. This operation may be accomplished with or without extrusion coating the metal sheet prior to passage through the embossing rolls.

X. In still a further form of the invention, the base sheet 16B' of FIGS. 4 or 5 may comprise a sheet of metal such as aluminum or the like and the coating or coatings 15'a and 15'b may comprise thin layers of plastic applied either as a single layer to either or both surfaces of the sheet or as a plurality of layers of different colors to said surface or surfaces. If applied as a single layer, the coating may be separated as described by embossing to provide designs in the surface of the sheet in which the base metal shows through. For highly attractive decorative effects, the surface of the base metal so coated may be provided in a condition of high luster by buffing, plating or other means so as to provide a highly reflective surface through which portions are seen when the coating layer is separated. If two layers of different colored plastic are coated on the metal surface, one may be embossed to separate so as to permit portions of the colored plastic therebeneath to show through.

XI. In yet another form of the invention, in FIGS. 4 and 5 the base sheet 16B and 16B' may comprise a metal such as aluminum with the strata indicated by coating or layers 15' and 15'' may comprise anodized surface layers provided on a coil supply of said sheet or automatically provided on the surface or surfaces of the extruding sheet. Embossing through the anodized surface will permit the metal therebelow to be seen from the exterior of the sheet or tube. Thus sheet, tubing or other shapes of anodized aluminum may be embossed to provide multicolor decorative effects and color anodizing may be employed. The apparatus may include, in addition to a first anodizing means such as a tank of anodizing solution disposed between the embossing rolls and the extruder, a second anodizing means disposed downstream of the embossing rolls to anodize the surfaces of the indentations or embossings or a coating means operative to provide a coating of clear plastic or other material over the entire surface of the anodized and embossed extrusion. The embossed indentations which may or may not be bare of anodized material may also be wipe filled with a clear or colored material by means disposed downstream of the embossing roll or rolls adapted to receive the extrusion or otherwise shaped member.

XII. A further apparatus and method for decorating elongated members includes the feeding of a freshly extruded member or otherwise formed elongated member through any suitable means operative to provide a thin coating thereon of a color different than the color of the material comprising the member, the solidification of said coating and the passage of said coated member through means such as an embossing roll or rolls, cutting tools, brushes, ultrasonic, or fluid pressure applicating means operative to separate or erode portions of the coating from the base member on a continuous basis.

Other forms of the invention include the following:

The extrusion or otherwise formed base member 16, 16A, 16B, etc. may comprise a polymeric material, ceramic or metal coated with an insulating material or metal per se while the strata on the surfaces or surface thereof to be separated by embossing or die cutting by means of a rotary tool as illustrated may comprise a thin film, plating or sheet of metal. In addition to providing highly decorative effects, such a combination of materials operated on as described to provide separations in said metal coating or film may be utilized to provide electrical circuits or portions of electrical circuits. The base sheet may be rigid or flexible not only for said circuit applications but for the others described hereinabove. For such applications, other means may also be employed for the continuous separation of the metal surface layer such as erosion or etching through a mask disposed against the surface of the sheet or extrusion as it is fed, heat erosion, electrical beam or arc discharge erosion, etc., operative on the member as it is fed from the extruder or other supply thereof. Automatic rotary brushing means operative through a mask disposed against the extrusion or sheet as it is fed may also be used to remove metal or coating material or to otherwise affect the surface or surfaces thereof.

With further reference to the embodiments illustrated in FIG. 4, if the thickness of the total sheet being embossed in less than about one-sixteenth inch, the two rolls 24A and 24B may be shaped to cooperate in providing indentations in one surface of the sheet and projections in the other surface thereof which projections define portions of the base sheet 16B' pushed upward through the coating by the raised portions of the embossing roll engaging the other surface of the base sheet.

Referring also to the blow-molding apparatus and process set forth on page 16 variations are noted therein which include the provision of inflections or sudden indentations such as V-shaped elongated cavities in the wall of the mold or die into which the coated sheet material is blown or otherwise forced, said V-shaped cavities being operative to cause separation of the coating material whereby the base material shows through. The procedure may also be applied to the decoration of vacuum or pressure formed thermoplastic sheet fed directly from the extruder 12' or a coil supply thereof reheated to molten formable condition or formed cold by means of a press or fluid under pressure into said mold or die cavity having said indentations provided in the walls thereof. During the forming of such sheet, drawing or forcing the coated or laminated multicolored materials thereof into the channels or V-shaped cavities has the effect to separate the coating material and force the base sheet material or the material beneath said coating to flow into the cavity or cavities in the mold wall (which may be in the order of one thirty-second to one-eighth inch wide at the surface of the mold wall) thereby defining a surface of the resulting molded sheet which surface is defined by a combination of both materials as the base plastic has substantially replaced the surface layer in those areas where the latter has separated. Such multilayer sheet material may also be die-stamped to shape and simultaneously surface decorated as described.

Either or both embossing rolls shown in FIGS. 1 to 5 may also be provided with sharp or V-shaped cavities in their surfaces into which material is forced by compression of the surface of the roll against the extrusion or otherwise shaped member to provide the surface embossed, multicolor effects described above. Also colorants may be applied to selected areas of the extrusion applied by either or both the illustrated rolls as the extrusion is fed to the bite thereof.

The rolls of FIGS. 1 and 4 may be positioned as illustrated or further downstream of the extruder to receive the freshly extruded metal, ceramic or plastic and perform other operations thereon in addition to extrusion. For example, one or more pairs of rolls may be utilized to coat the extrusion with the described material(s) for the decorative embossing thereof by further rolls positioned downstream of the coating rolls. The coating may be calendered or roller coated on the freshly extruded material along the entire or selected portions of its surface. Said material may also be powdered polymeric or ceramic or metal materials which is applied by means of rollers to the entire or selected areas of the extrusion and bonded thereto by fusion and/or pressure means resulting from rolling. The heat of the freshly extruded material may be operative to melt the powdered particles into a uniform coating or heat may be conducted through the rolls or by external means downstream of the rolls.

Figure 6:
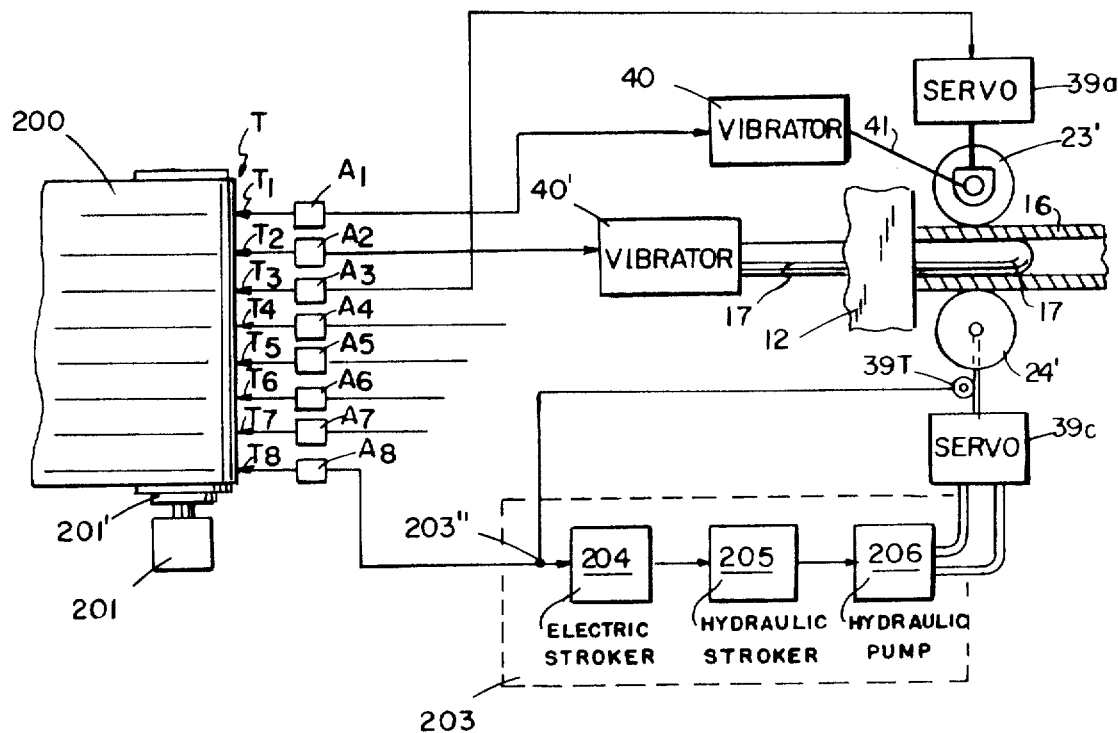
FIG. 6 is a schematic diagram of a feedback control system applicable to the apparatus of FIGS. 1-5.

In FIG. 6 is shown programming and automatic control means for effecting automatic preprogrammed and feedback control of variables of the described extrusion apparatus as set forth in greater detail in my said copending application Ser. No. 142,405. The control system of FIG. 6 may be applied to the extrusion apparatus of FIGS. 1 and 2 or FIGS. 4 and 5.

In FIG. 6, automatic sequential control various power-operated components of an automatic extrusion apparatus is effected by reproducing and utilizing one or more command signals recorded in a predetermined order on the surface of a magnetic drum or tape 200 moving at constant velocity of intermittently moved past multiple reproduction transducer heats T, a plurality of which T1 to T-8 are illustrated for controlling different extrusion variables including the operation of one or more servo devices for rotating the described embossing or drive rolls and servomotor means as described for radially or otherwise moving either or both embossing rolls to predeterminately engage and disengage respective surfaces of an extrusion.

In FIG. 6, notation 39c refers to a variable speed controlled motor for effecting the rotational operation of a roller or embossing die 24' and notation 39a refers to a second servomotor for advancing and retracting a second roller 23' which cooperates with roller 24' in embossing or driving the extrusion as hereinbefore described.

Assuming that notation 200 refers to a multiple channel magnetic recording tape containing predeterminately recorded command recordings on each of the channels aligned with the transducers T for modulating same as the tape is driven and providing output command signals for controlling various motors operating the extrusion apparatus, said tape 200 is shown in part and is driven through a tape transport system shown in part as including a pulley or drum 201' which is driven by a constant speed controlled motor 201 to predeterminately drive the tape past the transducers. Notations $A_1$ to $A_8$ refer to reproduction amplifiers in the output of respective transducers T for amplifying the reproduced command signals and feeding same to effect the desired control functions of the various components of the automatic extrusion apparatus. The command signal reproduced by transducer $T_8$ is fed to the input of a control arrangement 203 which includes an electric stroker 204, a hydraulic stroker 205 and a variable displacement hydraulic 206. The characteristics of the variable displacement hydraulic pump 206 are such that, depending on the position of the slide block thereof, which is controlled by the electrohydraulic stroker, it may pump in either direction and hence the position as well as the direction of motion of the ram of the hydraulic cylinder controlled thereby will be a function of the amplitude of the analog signal recorded on the channel of recording member 200 for controlling servo 39c or, in other words, the voltage input to the electric stroker. A closed loop speed control system is provided in which the output speed of motor 39c is measured by a feedback tachometer 39T driven by the shaft of motor 39c which follows the speed command of voltage resulting from the amplification of a signal reproduced by the transducer $T_R$ from the channel of tape 200 to which said transducer is operatively coupled. The analog command signal reproduced from the tape by transducer $T_8$ is of such a nature that the speed of the embossing or drive rolls will vary in proportion to the rate of travel of the extruding member and hence may be maintained constant or otherwise controlled by the reproduced analog command signal so as to predetermine the longitudinal force exerted on the extrusion by said rolls. The outputs of the feedback tachometer 39T and amplifier $A_H$ i.e., (of the command signal reproduced by transducer $T_H$) are fed to a comparator device 203'' such as a voltage comparator or summing amplifier adapted to provide an error signal on its output which error signal is fed to the input of the electric stroker 204. The electric stroker 204 thus controls the operation of the hydraulic stroker 205 which in turn controls the displacement of variable displacement pump 206 which directly controls the hydraulic servo 39c in accordance with the signals fed to the comparator device 203''. Accordingly, by the means described, the speed of the embossing or drive rolls may be predetermined during the extrusion cycle in accordance with the characteristics of the analog recording on the recording member 200 employed to effect such control.

Embossing or cooperative drive roller 23' may be freewheeling on engagement of the other surface of the extrusion or power rotated by a proper servo means as illustrated in FIG. 1, which servo means may also be controlled in its operation in the manner used to control hydraulic servo 39.

It thus can be seen that by predeterminately controlling the speed rotation of the hydraulic servo 39 which rotates either or both of the embossing or extrusion drive rollers, the force or longitudinal pull exerted on the extrusion 16 after it has been formed to shape and leaves the extrusion die, may be predetermined to effect the described working or pulling of the extrusion to predeterminately control the physical characteristic thereof.

It is noted that, if either or both rolls 23' and 24'' of FIG. 6 are employed to predeterminately emboss a pattern in the surface of the extrusion 16, such action may be improved or facilitated by vibrating the embossing means. Accordingly, a suitable vibration means 40 is shown having its output 41 operatively coupled to roller 23' for vibrating same during the embossing operation in a manner to both improve the characteristics of the embossed material and facilitate passage of the extrusion through the embossing rolls. A second vibrating means 40' is also shown coupled to the mandrel 17 for vibrating same either separately or in cooperation with the means vibrating the embossing means. Both said vibrating means may be coupled or secured to the shafts or drives for the rollers or the mandrel and may be electromechanical, hydraulic, pneumatic or piezoelectrically operated vibrators having controls connected to respective of the reproduction amplifiers A of the recorder for continuous or intermittent operation depending on the nature of the command control recordings on the record member 200. Suitable electromechanical transducing means comprise magnetic, solenoid or motor operated vibrators or piezoelectric crystal oscillators of known design which are operative to impart vibrations of predetermined frequency and amplitude to the embossing means and/or mandrel. If the vibrating means is driven directly by signals derived from recordings reproduced from member 200, then the frequency and amplitude of such recordings may be varied when recorded to cause predetermined variations in the frequency and amplitude of the vibrations generated by the transducing means in the embossing means and mandrel.

In a modified form of the invention illustrated in FIG. 6, the signals reproduced from recordings on member 200 by the transducer T8 which operated servo 39c may be of such a nature as to cause the output shaft to motor 39c to start and stop or increase and decrease in speed so as to impart intermittent, longitudinally varying forces to the extrusion by intermittently applying drag to the extrusion while maintaining the extrusion pressure constant to thereby further work the extrusion. The same effect may be had by varying operation of the extrusion screw or piston used to express material out of the extrusion die while maintaining a constant speed drive of the rolls 23' and 24'. The rolls 23' and 24' may also be operative solely as means for maintaining a constant longitudinal pulling force on the extrusion so as to prevent the extrusion from bowing or becoming warped beyond the extrusion die as is often experienced in extruding plastics and metals. Accordingly, one or more of the control systems 203 of FIG. 6 may be employed to automatically maintain a predetermined pulling force or tension on the extrusion in accordance with the characteristics of the recorded signals applied to control same by controlling the speed of rotation of respective rollers mounted to operate on the extrusion as are the rollers 23 and 24 of FIGS. 1 and 2 or the rolls shown in FIGS. 4 and 5. In another form of this embodiment, the rolls of FIGS. 4 and 5 may be replaced by respective power-operated belt-type conveyors each operative by a respective motor to cooperate with the other in exerting force on the extrusion passing therebetween to maintain a net longitudinal tension force on the extrusion for preventing warping or bowing of the extrusion. The motors driving such conveyors may be controlled by respective feedback control means of the type shown in FIG. 6 and including means for applying a control signal and the means shown for assuring that the motors are operative in accordance with the magnitude of said control signal.

The control signal may also be operative so as to control the operation of one or more motors driving one or more pairs of rollers located beyond the end of the extruder to cooperate in stretching and predeterminately drawing the extrusion to predeterminately reduce its wall thickness or cross section and thereby predeterminately work the material thereof.

The described means for inducing vibrations in one or both of the rollers 47 and 49 may be coupled directly to and supported by either or both the axles 48 and 50 supporting the rollers 47 and 49 or may be mounted on and supported by either or both rollers and supplied with vibrational energy through suitable rotary electrical or fluid coupling means for transmitting said energy to the rotating assembly as it rotates. If a suitable source of high-frequency electrical energy above 20 kilocycles per second is provided, the vibrating means may comprise one or more piezoelectric transducers made of barium titanate or lead zirionate and secured to either or both shafts or rollers or coupled directly thereto by means of a bar-coupling device riding thereagainst.

The apparatus of FIG. 6 may also be operated by imparting vibrational energy as described to the extrusion mandrel per se shown disposed between the rollers 23' and 24' or to said mandrel simultaneously as vibrational energy is applied to either or both said rollers to serve one or more of the functions of facilitating passage of the extrusion through the rollers and working the extrusion material.

Operation of the apparatus of FIG. 6 may be such as to simultaneously impart vibrational energy of the type described to the work through the rollers and/or mandrel and simultaneously draw or stretch the work by proper speed control of the motors 23' and 24' so as to work the material of the extrusion by a combination of these actions.

If two or more materials are simultaneously coextruded to from a single elongated sheet, plate, tube or other structural member, the vibrational and/or cooperating rolling means described and illustrated in the drawings may be employed to work either or both materials to improve their physical characteristics and to effect or enhance the bond between said materials.

Figure 7:
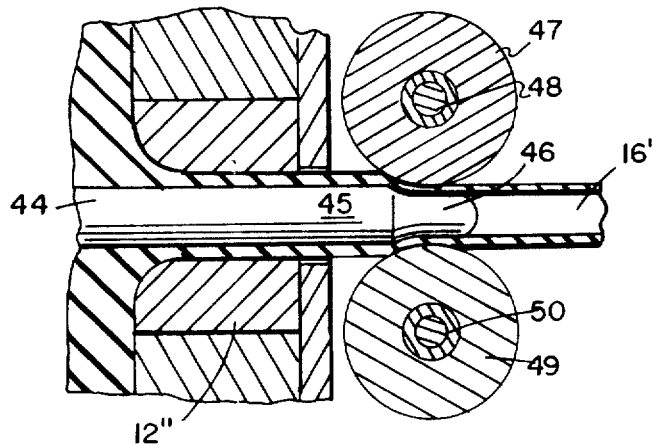
FIG. 7 is a side view in partial cross section of a modified form of extrusion apparatus embodying features of the apparatus of FIG. 1.

In FIG. 7 is shown a modified form of the invention wherein a plurality of rolls of the type described cooperate with an extrusion mandrel in working and reshaping an extrusion formed over said mandrel. Shown in FIG. 7 is part of an extrusion apparatus including a die 12" having a die opening and a mandrel 44 disposed in said die opening and protruding outwardly from the end face of said die. The mandrel 44 has a first portion 45 of a first diameter or shape over which an extrusion 16 is first formed to shape after passing through said die. Protruding outwardly beyond the first portion 45 of the mandrel is a second mandrel portion 46 having a shape which is different from that of the first portion 45. The first and second portions 45 and 46 of mandrel 44 illustrated in FIG. 7 are substantially cylindrical in external shape and of different diameters.

To cause the extrusion 16 to conform to the surface of end portion 46 of the mandrel, a plurality of forming rolls 47 and 49 are rotationally supported to engage opposite portions of the extrusion as it leaves portion 45 and to compress same against the surface portion 46. The rolls 47 and 49 may be driven as described to compressively shape the extrusion 16 to define a new shape 16' thereof against the end portion 46 of the mandrel for selected portions of the length of the extrusion. If it is desired to so shape certain portions of the extrusion while retaining the shape 16 along other lengths thereof, rolls 47 and 49 which respectively rotate on shafts 48 and 50 may be predeterminately advanced and retracted relative to the extrusion at predetermined times during as extrusion cycle to provide a tubular shape which varies in a predetermined manner along selected portions of the length thereof. Such movement of the rolls 47 and 49 may be effected by conventional power operated servo means (not shown).

I claim:

1. An extrusion apparatus comprising in combination with an extruder having a die and means for feeding and forcing an extrusion material through said die to form an elongated extrusion; power-operated means situated beyond said die for receiving, engaging and drawing the extrusion away from said die; said power-operated means including a servo means operative for driving said extrusion means; variable controls for said servo means including first means for generating an electrical reference command control signal, and second means operative for generating a feedback electrical signal which varies in accordance with variations in the speed of said servo means and the force exerted on the extrusion by said engaging means driven by said servo means, electrical comparator means operative to receive said reference electrical command control signal and said electrical feedback signal and to generate a difference electrical signal and means for applying said difference signal to said servo means so as to cause said servo means to operate in accordance with said command control reference signal whereby the speed of said extrusion is maintained substantially in accordance with the characteristics of said reference signal.

2. An extrusion apparatus in accordance with claim 1, said extrusion die being operative to form said extrusion material into an elongated tube, said receiving and engaging means comprising a plurality of driving devices operative to engage opposite faces of said tube as it is fed from said die, each of said devices being operative to exert a pulling force on the tube in cooperation with the other of said devices, said reference electrical signal being such as to effect the control of said power-operated means to exert a net pulling force on the tube to draw said tube away from the die.

3. An extrusion apparatus in accordance with claim 1, said means for generating a reference signal comprising a controller having a record member with recordings thereon and transducing means for reproducing said recordings and generating said reference signal, the output of said transducing means on which said command control reference signal is generated being operatively connected to said comparator means.

4. An extrusion apparatus in accordance with claim 1, said variable controls for said servo means including an electric stroker connected to the output of said comparator means, a hydraulic stroker operated by said electric stroker and a hydraulic pump variably controlled by said hydraulic stroker, the output of said pump being connected to operate said servo means and to vary the operation of same in accordance with variations in the output of said comparator means whereby a predetermined tensional force is maintained in the extrusion feeding from said die and driven by said power-operated driving means.

5. An apparatus for forming continuously shapes comprising: permanently deformable
   first means operative to receive and continuously form a permanently deformable material to a first elongated shape,
   second means operative to receive and guide said first shape as it is formed,
   motor means for powering (driving) said second means to draw said first shape away from said first means,
   variable electrical control means for controlling operation of said motor means, means for generating a reference electrical control signal, means for generating feedback electrical signal indicative of the operation of said second means, comparator means operative to receive said reference control signal feedback signal and to generate a difference electrical signal, and means for applying said difference electrical signal to said variably control means for said motor means to predeterminately control the operation of said second means for drawing said elongated shape from said first means (with a force) in accordance with the characteristics of said reference electrical signal.

6. An apparatus in accordance with claim 5, said second means comprising a plurality of cooperating powered rollers, said motor means being operative to drive said powered rollers.

7. Apparatus in accordance with claim 5, said means for forming elongated shapes comprising die means and means for forcing said deformable material through said die means.

8. Apparatus in accordance with claim 5, including a master control means operative to simultaneously control said first means and said motor means in a manner to cause said second means to draw said elongated shape away from said first means whereby said shape is maintained in a predetermined state of tension as it is drawn from said first means.

9. Apparatus in accordance with claim 8, said second means including cooperating rolls power rotated by said roller means, said motor means being controlled by said reference signal to stretch draw said elongated shape so as to permanently deform said to a shape other than that at which it is formed in said first means.

10. An apparatus in accordance with claim 5, including vibrating means operable for vibrating said second means as it operates to draw said extrusion from said first means.

11. An apparatus in accordance with claim 10, including automatic control means for said vibrating means for predeterminately controlling the frequency of said vibrations.

12. An apparatus in accordance with claim 10, including automatic control means for said vibrating means operative for controlling the amplitude of said vibrations.

13. An apparatus in accordance with claim 10, including control means for variably controlling said vibrating means to vibrate at different amplitudes and frequencies during extrusion.